INVENTOR
THEODORE C. BAKER
BY Rule & Hoge
ATTORNEYS

Dec. 13, 1960 T. C. BAKER 2,963,821
APPARATUS FOR SEVERING A STREAM OF PLASTIC MATERIAL
Filed Aug. 16, 1956 2 Sheets-Sheet 2
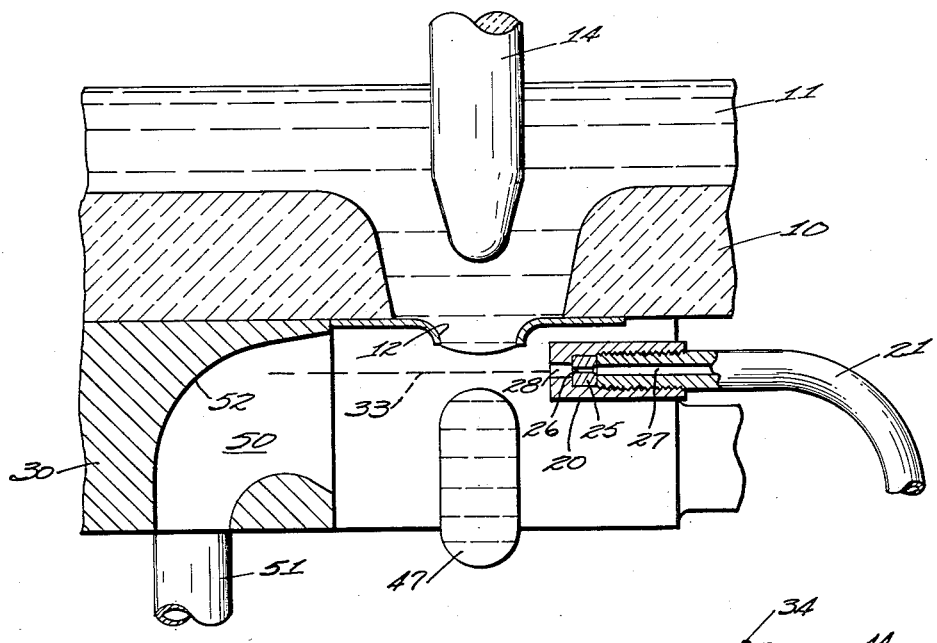
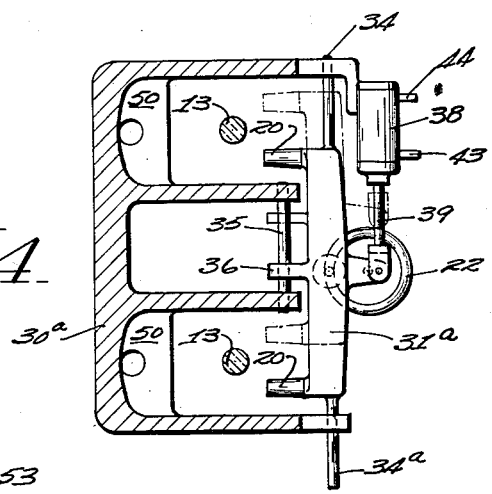
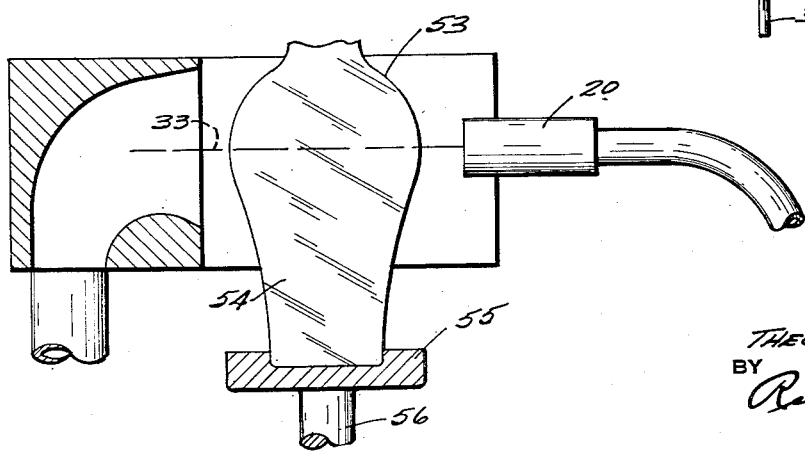
INVENTOR
THEODORE C. BAKER
BY
ATTORNEYS

United States Patent Office 2,963,821
Patented Dec. 13, 1960

2,963,821

APPARATUS FOR SEVERING A STREAM OF PLASTIC MATERIAL

Theodore C. Baker, Wayne, Ohio, assignor to Owens-Illinois Glass Company, a corporation of Ohio Filed Aug. 16, 1956, Ser. No. 604,356

5 Claims. (Cl. 49—55)

My invention relates to an apparatus for use in cutting or shaping glass or other materials, which may be in a soft or plastic condition, by means of fluid jets, in a liquid or gaseous form, which are propagated at super velocities and pressures. The invention may be used for severing gobs or mold charges of glass or other plastic materials from a supply body for use in molding articles. The invention is also useful in other cutting or shaping methods as, for example, severing the moil from the rim of a glass tumbler or other hollow ware, boring or cutting holes in either hot or cold glass, improving burn-off and crack-off processes in the glass art, and for other purposes. Various fluids in either gaseous or liquid form may be used with the jets, such as air, nitrogen, carbon dioxide, water or glycerine, and also mixtures of such fluids. Super pressures of the fluids are used to attain the necesary high velocities of the issuing jets. Such pressure may vary within the range of from about 10,000 pounds per square inch (p.s.i.) to about 250,000 p.s.i. The jets issue from small outlet orifices which should be preferably in the neighborhood of .001 inch to .010 inch in diameter. The required super pressure may be supplied by pumps and pipe fittings in accordance with standard practice in the chemical industry.

One use of the present invention, as herein illustrated, is for severing gobs of molten or plastic glass in rapid succession as the glass issues from the bottom outlet orifice of a glass tank or furnace forehearth. The super pressure jet is caused to traverse the column of issuing glass, the jet cutting through the glass by a horizontal movement transverse to the direction of the jet or the issuing column of glass may be caused to pass through the jet.

A further form of the apparatus herein illustrated is employed for severing the moil from a glass tumbler or other article.

An object of the present invention is to provide means for cutting, severing, or shaping glass while in a molten or plastic condition without chilling the glass at the point or area of severance.

A further object of the invention is to provide a novel means for severing molten or plastic glass without contacting it with metal or other chilling material used as a severing means.

A further object of the invention, as employed with glass feeders for severing gobs or mold charges, is to provide a method and means for preventing the local chilling always present in the usual methods of severing the glass by metal shears, thereby preventing the so called chill marks in the finished ware, and also dispensing with the use of means and methods commonly used for overcoming the chilling effects when the glass has been chilled by the shears.

Other objects of the invention will appear hereinafter.

Referring to the accompanying drawings:

Fig. 3 is a vertical section at the line 3—3 on Fig. 2 on a comparatively large scale;

Fig. 4 is a sectional plan view of a modification adapted for severing a plurality of gobs or mold charges simultaneously; and Fig. 5 is a fragmentary sectional elevation of an apparatus for severing the moil from a molded tumbler or other article.

Figure 1:
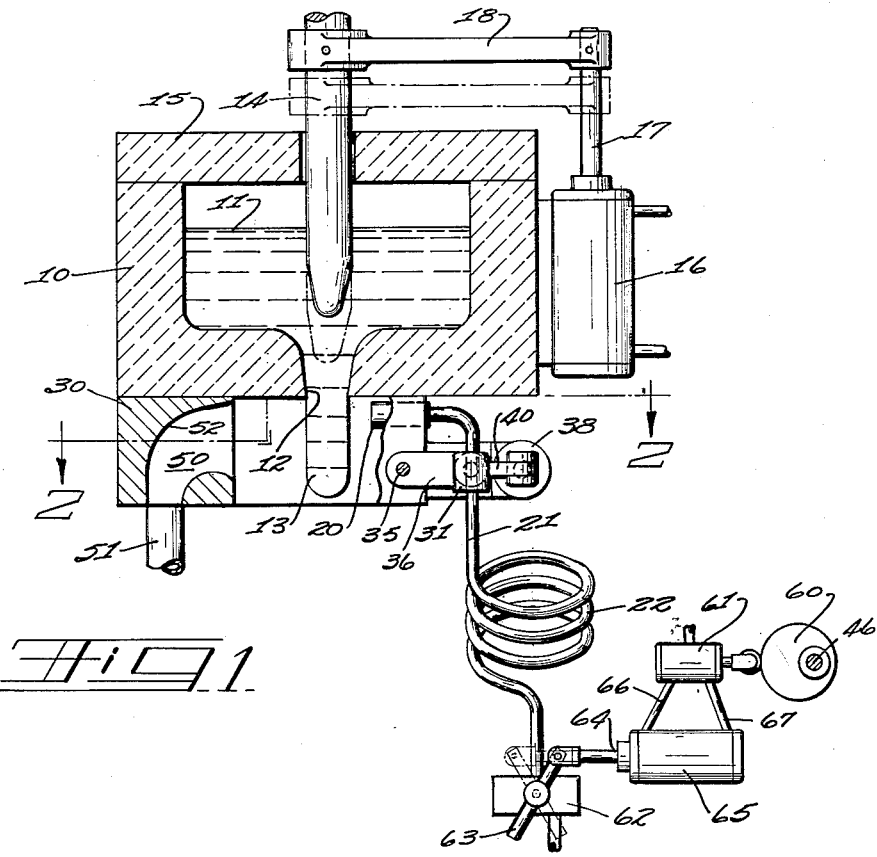
Fig. 1 is a sectional elevation of a glass feeder embodying one form of apparatus for practicing the present invention.
Figure 2:
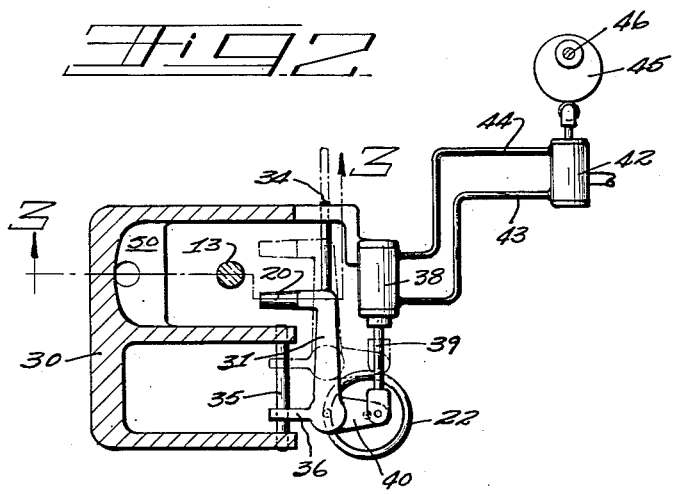
Fig. 2 is a horizontal section substantially at the line 2—2 on Fig. 1.

Referring to Figs. 1, 2, and 3, a container 10 for a supply body of molten glass 11 is herein shown as a conventional form of forehearth for a glass melting and refining tank. The floor of the forehearth is provided with an outlet opening 12 through which the glass, in a molten or plastic condition, issues in the form of a cylinder or column 13. The discharge of the glass through the outlet 12 is controlled in a well known manner by a plunger 14 which extends downward through an opening in the cover plate 15 of the forehearth. The plunger is periodically reciprocated vertically between the full line and broken line positions for controlling the rate of flow and shape of the issuing column 13 of glass. The plunger is reciprocated by a cylinder or piston motor 16 comprising a piston and piston rod 17, the latter connected by an arm 18 to the plunger 14.

The issuing glass is periodically severed at a plane a short distance beneath the feeder outlet 12. The means for severing the glass comprises a fluid jet issuing from a nozzle 20. The fluid is supplied to the nozzle through a pipe 21 which includes a coil 22. The pipe is connected to any suitable source of fluid under super pressure. This pressure may be within the range of 10,000 to 250,000 p.s.i. although slightly lower pressures may in some instances and under certain conditions be used. The velocity of the jet and accordingly the pressure must be sufficiently great to project a substantially solid jet which is capable of cutting through the column of glass while the jet is moved transversely as by means of a lateral movement of the nozzle 20. The force of the jet should be sufficient to permit the jet to shear across the glass rapidly without material deflection or deviation from its straight line movement and without dissipation or spreading.

Referring to Fig. 3 the nozzle 20 is screw threaded on the pipe 21. A removable plug or insert 25 is placed within the nozzle at the end of the pipe 21 and is formed with an outlet opening 26 extending therethrough. The size and shape of the bore 26 determines the size of the issuing jet. The size or cross sectional area of the bore 26 is much smaller than the bore 27 of the pipe 21 and also of smaller diameter than the outlet opening 28 in the nozzle 20. The plug 25 is interchangeable with other plugs having different size bores.

The severing mechanism is supported by a stationary frame or block 30 which may be a metal casting mounted beneath the outlet 12. The nozzle 20 is secured to a carrier 31 mounted for reciprocation horizontally in the frame 30. The reciprocating movement of the nozzle is transversely of the issuing column of glass 13 and perpendicular to the direction of the issuing jet, such direction being indicated by the broken line 33 (Fig. 3). The carrier 31 is supported and guided in its movements by a rod 34 integral with the carrier and extending through a guide opening in the frame 30. The carrier 31 is further supported and guided by a stationary rod 35 fixed in the frame 30 and extending through an opening in an arm 36 integral with the carrier.

Means for reciprocating the carrier 31 comprises a piston motor 38 mounted on the frame 30 and having a piston rod 39 connected to an arm 40 on the frame 31. The operation of the motor 38 is under the control of a motor control valve 42 having pipe connections 43 and 44 with the cylinder 38. The valve 42 is operated by an eccentric 45 on a shaft 46 which is operatively connected for rotation in synchronism with the reciprocating movements of the plunger 14.

As the carrier 31 and nozzle 20 move from the full line position (Fig. 2) to the broken line position the issuing jet 33 cuts through the issuing column 13 thereby severing a charge or gob 47 which drops by gravity and is directed into a mold cavity. The severing movement of the jet is in a horizontal plane and is of such rapidity that the cut surface is substantially or approximately horizontal. When the motor 38 is reversed the issuing jet severs another gob of glass during its return movement.

As the column of glass issues from the forehearth a surface skin of chilled glass is immediately formed by contact with the air. When gobs are severed with the usual metal shears a scar of chilled glass is produced at the end of the gob by the chilling action of the shear. This chilled glass appears later as a "shear mark" or defect in the finished ware unless some special means is provided for eliminating it. With the present invention the jet 33 cuts through the glass with comparatively slight or no appreciable chilling effect. As a result of the thin skin of chilled glass which forms on such severed surface when exposed to the ambient air immediately after the severance is thinner than the chilled glass on the circumferential surface which has been longer exposed to the air. The severed gob is accordingly in condition for being molded by the usual methods without any scar or chill mark appearing in the finished article. Any chilling effect due to the jet 33 may be reduced by raising the temperature of the jet or fluid supply. Temperatures up to 1200° F. are found practical but the temperatures may be in excess thereof.

The block 30 is formed with an opening 50 through which the gas is discharged into an exhaust pipe 51. The curved wall 52 of the opening 50 provides a stop for the high velocity jet 33. This wall is so shaped that the jet 33 impinges upon it at an acute angle which deflects and directs the gas into the exhaust pipe. This angular relation of the jet and the surface at the point of contact materially reduces the tendency of the jet to penetrate such surface, thus avoiding rapid wear of the block 30 or the surface portion in the path of the high pressure gas. The wall 52 is made of hardened steel or other hard material highly resistant to the boring or penetrating of the jet.

The pipe 21 is not sufficiently flexible alone to permit the reciprocating movement of the nozzle attached thereto and therefore needed flexibility is provided by forming a portion of the pipe into the coil 22.

The jets may be either of the continuous type or they may be of the intermittently operating type. In the latter case a cam 60 mounted on the driven cam shaft 46, operating in synchronism with cam 45, will be adapted to actuate a valve 61 at the proper time intervals and provide actuation of a needle valve 62. The valve 62 has a valve arm 63 pivotally connected to a piston 64 of an air motor 65. The operation of motor 65 is under control of the motor control valve 61 having air connections 66 and 67 with the motor 65.

Thus as the motor 38 operates to move the nozzle 20 transversely relative to the stream of issuing glass, the cam 60 will actuate valve 61 which in turn actuates motor 65 and needle valve 62 to permit the fluid under super pressure to issue from the nozzles 20 under timed cam control. A similar cam and valve structure may be provided on shaft 46 for control of the air motor 16 to cause it to operate in timed relation to operation of the motors 38 and 65.

Fig. 4 illustrates a modified construction used for severing a plurality of mold charges simultaneously from a corresponding number of columns 13 of glass issuing from separate outlets in the furnace forehearth. As shown there are two columns of glass issuing simultaneously although this number obviously may be increased. A plurality of nozzles 20 are in this instance attached to a single reciprocating carrier 31ª which is mounted in a frame 30ª. The means for mounting frame 31ª for reciprocation is substantially the same as that employed for the frame 31 except that an additional rod 34ª is fixed to the carrier and slidably mounted within the frame 30ª. With this construction each movement of the carrier 31ª causes a simultaneous severance of gobs from both columns 13.

The above described apparatus is adapted for severing gobs or mold charges in rapid succession, adequate to meet the requirements of high speed molding or forming machines. The rate at which the glass will be discharged depends in a considerable measure on the shape and mode of operation of the plunger 14 and its relation to the discharge outlet. A modified method of obtaining a rapid discharge of glass from the container consists in maintaining a super-atmospheric pressure on the glass within the container. Thus the glass may be delivered from a closed melting and refining tank provided with one or more bottom outlets and in which a high pressure is maintained within the tank.

Fig. 5 illustrates a modified construction in which the jet 33 operates as a means for severing the moil 53 from a glass tumbler 54 or other article. The hollow article 54 is transferred from the molding machine to a pad or support 55 on a vertical spindle 56. The spindle with the article thereon is rotated about the vertical axis of the spindle and article thereon while the jet 33 is directed against the article at the desired plane of severance, thereby severing the moil 53. This operation may take place while the glass is still hot and plastic although the glass must be sufficiently cooled to permit the article to retain its shape.

Other materials of plastic or solid character may be severed in accordance with the present invention.

The term "super pressures" as used herein is to be interpreted as including pressures from 10,000 p.s.i. up to approximately 250,000 p.s.i.

Modifications other than those herein illustrated and described may be resorted to within the spirit and scope of my invention as defined in the appended claims.

I claim:

1. Apparatus for severing an end portion of a stream of plastic material in columnar form from the stream to form a separated gob of said material, comprising a nozzle having a restricted opening, a conduit supplying fluid under super pressure to said nozzle, means supporting said nozzle in close proximity to said stream of material and positioning the nozzle to direct fluid flowing from said nozzle axially of the nozzle in a single direction at high velocity against said stream of material to shear the stream, and means for effecting relative movement of said stream and said nozzle transversely of the stream and in the plane of the axis of said nozzle.

2. Apparatus as set forth in claim 1 in which means are provided on said support restraining said nozzle for reciprocating motion with respect to said support in said plane, and means for reciprocating said nozzle.

3. Apparatus as set forth in claim 1 in which means are provided for flowing said plastic material at a varying rate of flow, and in which means are provided for varying the flow of the fluid through said nozzle in synchronism with the variation of the flow of said plastic material.

4. Apparatus as set forth in claim 1 in which means are provided for flowing said plastic material at a varying rate of flow, and in which the means for effecting relative transverse movement of the nozzle and stream are synchronized with the means for varying the flow of the plastic material.

5. Apparatus as set forth in claim 1 in which the means for supplying fluid to said nozzle imposes a super pressure of at least 10,000 p.s.i. in said conduit.

References Cited in the file of this patent

UNITED STATES PATENTS

| | | |
|---|---|---|
| 814,773 | Dixon et al. | Mar. 13, 1906 |
| 1,404,142 | Riedel | Jan. 17, 1922 |
| 1,747,087 | Schmalz | Feb. 11, 1930 |
| 1,748,550 | Haub | Feb. 25, 1930 |
| 1,775,199 | Haub | Sept. 9, 1930 |
| 1,878,184 | Roesen | Sept. 20, 1932 |
| 2,215,980 | Schreiber | Sept. 24, 1940 |
| 2,259,955 | Jones | Oct. 21, 1941 |
| 2,302,182 | Bucknam | Nov. 17, 1942 |
| 2,340,194 | McMullen | Jan. 25, 1944 |
| 2,533,311 | Chelborg et al. | Dec. 12, 1950 |
| 2,729,031 | Wolf | Jan. 3, 1956 |